(12) United States Patent
Kim et al.

(10) Patent No.: US 8,557,098 B2
(45) Date of Patent: *Oct. 15, 2013

(54) CAPACITIVE DEIONIZATION DEVICE

(75) Inventors: Chang-hyun Kim, Seoul (KR);
Hyo-rang Kang, Anyang-si (KR);
Ho-jung Yang, Suwon-si (KR);
Hyun-seok Kim, Seoul (KR)

(73) Assignee: Samsung Electronics Co., Ltd. (KR)

( * ) Notice: Subject to any disclaimer, the term of this patent is extended or adjusted under 35 U.S.C. 154(b) by 388 days.

This patent is subject to a terminal disclaimer.

(21) Appl. No.: 12/855,832

(22) Filed: Aug. 13, 2010

(65) Prior Publication Data

US 2011/0147212 A1      Jun. 23, 2011

(30) Foreign Application Priority Data

Dec. 21, 2009   (KR) ......................... 10-2009-0128332

(51) Int. Cl.
*C02F 1/46* (2006.01)

(52) U.S. Cl.
USPC ........... 204/633; 204/252; 204/518; 204/519; 204/520; 204/522; 204/630; 204/660; 204/661; 204/663; 230/742; 230/746; 230/748

(58) Field of Classification Search
USPC ......... 204/252, 518–520, 522, 630, 633, 660, 204/661, 663; 205/742, 746, 748
See application file for complete search history.

(56) References Cited

U.S. PATENT DOCUMENTS

| | | | |
|---|---|---|---|
| 4,221,642 A | 9/1980 | De Nora | |
| 4,313,808 A | 2/1982 | Idemoto et al. | |
| 4,600,493 A | 7/1986 | Korngold | |
| 4,715,939 A | 12/1987 | Ball et al. | |
| 4,752,373 A | 6/1988 | Korngold | |
| 5,645,703 A | 7/1997 | Tsai | |
| 6,056,878 A | 5/2000 | Tessier et al. | |
| 6,090,259 A | 7/2000 | Fajt et al. | |
| 6,325,907 B1 | 12/2001 | Andelman | |
| 6,709,560 B2 * | 3/2004 | Andelman et al. | 204/630 |
| 7,000,409 B2 | 2/2006 | Mazzetti | |

(Continued)

FOREIGN PATENT DOCUMENTS

| | | |
|---|---|---|
| EP | 1348670 A1 | 10/2003 |
| EP | 2287117 A1 | 2/2011 |

(Continued)

OTHER PUBLICATIONS

European Extended Search Report; Application No. 10187776.9 dated May 20, 2011.

(Continued)

*Primary Examiner* — Keith Hendricks
*Assistant Examiner* — Salil Jain
(74) *Attorney, Agent, or Firm* — Cantor Colburn LLP

(57) ABSTRACT

A capacitive deionization device includes; at least one flow path configured to receive influent fluid, at least one pair of electrodes, at least one charge barrier disposed between the at least one flow path and a corresponding electrode of the at least one pair of electrodes, at least one electrolyte solution disposed between at least one of the at least one pair of electrodes and a corresponding charge barrier of the at least one charge barrier, and at least one electrolyte compensation device in fluid communication with the at least one electrolyte solution, wherein the at least one electrolyte solution differs from the influent fluid.

20 Claims, 11 Drawing Sheets

(56) References Cited

U.S. PATENT DOCUMENTS

| | | |
|---|---|---|
| 7,505,250 B2 | 3/2009 | Cho et al. |
| 2002/0167782 A1 | 11/2002 | Andelman et al. |
| 2003/0077515 A1 | 4/2003 | Chen et al. |
| 2003/0098266 A1 | 5/2003 | Shiue et al. |
| 2004/0174657 A1 | 9/2004 | Andelman et al. |
| 2005/0103634 A1 | 5/2005 | Andelman et al. |
| 2007/0158185 A1 | 7/2007 | Andelman et al. |
| 2008/0047844 A1 | 2/2008 | Miyashita |
| 2008/0289950 A1 | 11/2008 | Andelman et al. |
| 2008/0290546 A1 | 11/2008 | Andelman et al. |
| 2009/0086409 A1 | 4/2009 | Kang et al. |
| 2009/0090627 A1 | 4/2009 | Andelman et al. |
| 2009/0242419 A1* | 10/2009 | Aldridge et al. ............. 205/335 |
| 2011/0147212 A1 | 6/2011 | Kim |
| 2011/0162965 A1 | 7/2011 | Kim |

FOREIGN PATENT DOCUMENTS

| | | |
|---|---|---|
| JP | 08127886 A | 5/1996 |
| JP | 1996187492 A | 7/1996 |
| JP | 1997024374 A | 1/1997 |
| JP | 2000140853 A | 5/2000 |
| JP | 2001-137858 A | 5/2001 |
| JP | 2001259645 A | 9/2001 |
| JP | 2001314867 A | 11/2001 |
| JP | 2001314868 A | 11/2001 |
| KR | 1020060126607 A | 12/2006 |
| KR | 1020070102778 A | 11/2008 |
| KR | 1020080102778 A | 11/2008 |
| KR | 2009-0077161 | 8/2009 |
| KR | 1020090093323 A | 9/2009 |
| KR | 20090077161 A | 2/2011 |
| WO | 98/28230 A1 | 7/1998 |
| WO | 9828230 | 7/1998 |
| WO | 02086195 A1 | 10/2002 |
| WO | 2009062872 A1 | 5/2009 |

OTHER PUBLICATIONS

O'M. Bockris, et al., vol. 2 Modern Electrochemistry An Introduction of an Interdisciplinary Area, 7.4.6. An Experimetal Test of the Gouy-Chapman Model: Potential Dependence of the Capacitance, but at What Cost?, 7.4.7. Some Ions Stuck to the Electrode, Others Scattered in Thermal Disarray: The Stern Model, pp. 732-734 Chapter 7.

O'M. Bockris, et al., vol. 2 Modern Electrochemistry An Introduction of an Interdisciplinary Area, 7.4.6. An Experimetal Test of the Gouy-Chapman Model: Potential Dependence of the Capacitance, but at What Cost?, 7.4.7. Some Ions Stuck to the Electrode, Others Scattered in Thermal Disarray: The Stern Model, pp. 732-734 Chapter 7, 1973.

European Search Report dated May 20, 2011.

Broseus Romain et al., Removl of total dissolved solids, nitrates and ammonium ions from drinking water sing charge-barrier capacitive deionisation, Desalination 249, 2009, pp. 217-223.

European Search Report for Application No. 10170052.4-1213 dated Dec. 23, 2010.

EP Search Dated Apr. 21, 2011.

Final Office Action for U.S. Appl. No. 12/753,202 dated Apr. 11, 2013.

Non-Final Office Action for U.S. Appl. No. 12/753,202 dated Oct. 24, 2013.

Yoram Oren, Capacitive deionization (CDI) for desalination and water tratment-pas, present and future (a review), ScienceDirect Desalination 228 (2008) pp. 10-29.

* cited by examiner

CAPACITIVE DEIONIZATION DEVICE

CROSS-REFERENCE TO RELATED APPLICATION

This application claims priority to Korean Patent Application No. 10-2009-0128332, filed on Dec. 21, 2009, and all the benefits accruing therefrom under 35 U.S.C. §119, the content of which in its entirety is incorporated herein by reference.

BACKGROUND

1. Field

The present disclosure relates to a capacitive deionization device, and more particularly, to a capacitive deionization device that includes at least one electrolyte solution having ionic species contained therein, the types and/or total concentration of which differ from those of ionic species contained in influent water to the capacitive deionization device; and at least one electrolyte compensation device in fluid communication with the at least one electrolyte solution.

2. Description of the Related Art

A capacitive deionization ("CDI") device is used to remove an ionic material from a medium, for example, hard water, typically by applying a voltage to a pair of electrodes having nano-sized pores in order to polarize the pair of electrodes, so that the ionic material is adsorbed onto a surface of at least one of the pair of electrodes. In the typical CDI device, when a low direct current ("DC") voltage is applied to the pair of electrodes while the medium containing ions dissolved therein flows between the two electrodes, wherein one of the electrodes functions as a positive electrode and the other of the electrodes functions as a negative electrode, anions dissolved in the medium are adsorbed and concentrated in the positive electrode, and cations dissolved in the medium are adsorbed and concentrated in the negative electrode. When a current is supplied in a reverse direction, e.g., by electrically shorting the two electrodes, the concentrated ions are desorbed from the negative electrode and the positive electrode. Since the CDI device does not use a high potential difference, the energy efficiency thereof is high. Furthermore, the CDI device may also remove detrimental ions as well as hardness components when ions are adsorbed onto the electrodes, and does not use a chemical to regenerate the electrodes and thus the typical CDI device has a relatively low environmental impact.

However, in the general CDI devices, when a potential is applied to the electrodes, a large number of ions, i.e., co-ions, present in pores of the electrodes with the same polarity as the corresponding electrodes are expulsed into effluent water. As such, it is difficult to control all ions to be moved towards the corresponding electrode. For this reason, typical CDI devices have a relatively low ion removal efficiency compared to the amount of applied charges.

In order to address these drawbacks of such general CDI devices, Andelman et al. (U.S. Pat. No. 6,709,560) introduce a charge-barrier CDI device including a charge barrier such as an ion exchange membrane to improve the ion removal efficiency of the CDI device.

The charge-barrier CDI device is advantageous, as compared to general CDI devices, when it is used to treat water, such as seawater, containing a high concentration of ions, wherein the prevention of co-ion expulsion is important. However, when the charge-barrier CDI device is used to treat hard water including a hardness component of 300 ppm or less by weight, the concentration of ions in pores of the electrodes is relatively low and the ion transfer rate in the pores is also low. Thus, the capacitances of electrode materials may not be fully utilized during charging/discharging.

In addition, such general CDI devices and the charge-barrier CDI device exhibit a lower ion removal efficiency when influent water to be treated contains ions (hereinafter, "detrimental ions") unsuitable for exhibiting capacitance with the electrode material.

SUMMARY

Provided is a capacitive deionization device that includes at least one electrolyte solution containing ionic species, the types and/or total concentration of which differ from those of ionic species contained in influent fluid, and at least one electrolyte compensation device in fluid communication with the at least one electrolyte solution.

Additional aspects will be set forth in part in the description which follows and, in part, will be apparent from the description, or may be learned by practice of the presented embodiments.

According to an aspect of the present disclosure, a capacitive deionization device includes; at least one flow path configured to receive influent fluid, at least one pair of electrodes, at least one charge barrier disposed between the at least one flow path and a corresponding electrode of the at least one pair of electrodes, at least one electrolyte solution disposed between at least one electrode of the at least one pair of electrodes and a corresponding charge barrier of the at least one charge barrier, and at least one electrolyte compensation device in fluid communication with the at least one electrolyte solution, wherein the at least one electrolyte solution differs from the influent fluid.

In one embodiment, the at least one electrolyte compensation device may include a compensation timing determination unit and a compensation unit.

In one embodiment, the compensation timing determination unit may measure a total concentration of ionic species contained in the at least one electrolyte solution, and may start operation of the compensation unit if the total concentration of the ionic species is out of a reference concentration range.

In one embodiment, the compensation timing determination unit may monitor at least one of a current and a voltage applied between the at least one pair of electrodes, and starts operation of the compensation unit when at least one of the measured current and the measured voltage is out of a reference current or voltage range.

In one embodiment, the compensation unit may compensate for a difference between the total concentration of ionic species contained in the at least one electrolyte solution and a reference concentration by supplementing the at least one electrolyte solution with an external electrolyte solution.

In one embodiment, the compensation unit may compensate for a difference between the total concentration of ionic species contained in the at least one electrolyte solution and a reference concentration by removing a solvent component from the at least one electrolyte solution.

In one embodiment, the at least one electrolyte compensation unit may compensate for a reduction in the total concentration of ionic species contained in the at least one electrolyte solution by recovering ionic species that are moved into the influent water from the at least one electrode and the corresponding electrolyte solution during a discharging process and supplying the recovered ionic species back into the at least one electrolyte solution.

In one embodiment, the at least one electrolyte compensation device may compensate for a reduction in a purity of the at least one electrolyte solution by exchanging the at least one electrolyte solution with an external electrolyte solution.

In one embodiment, the at least one charge barrier may include at least one of a selectively cation-permeable membrane and a selectively anion-permeable membrane.

In one embodiment, the at least one electrolyte solution may include types of ionic species which differ from those of ionic species contained in the influent fluid.

In one embodiment, the at least one electrolyte solution may include ionic species having a higher total concentration than a total concentration of ionic species contained in the influent fluid.

In one embodiment, the at least one electrode may include a polarity-variable electrode.

In one embodiment, the capacitive deionization device may further include at least one spacer defining the at least one the flow path.

In one embodiment, the capacitive deionization device may further include at least one current collector disposed on a side of each of the at least one pair of electrodes opposite to the flow path corresponding to the at least one pair of electrodes.

According to another aspect of the present disclosure, a capacitive deionization device includes; at least one flow path configured to receive influent fluid, at least one pair of a first electrode and a second electrode, at least one first charge barrier disposed between the at least one flow path and the corresponding first electrode, at least one second charge barrier disposed between the at least one flow path and the corresponding second electrode, at least one first electrolyte solution disposed between at least one first electrode and the corresponding first charge barrier, and at least one electrolyte compensation device which compensates for at least one of a loss of ionic species from the at least one first electrolyte solution, a reduction in a total concentration of the ionic species in the at least one first electrolyte solution and a reduction in purity of the at least one first electrolyte solution, wherein the at least one first electrolyte solution differs from the influent fluid.

In one embodiment, the at least one first charge barrier may include a selectively cation-permeable membrane, and the at least one second charge barrier may include a selectively anion-permeable membrane.

In one embodiment, the capacitive deionization device may further include at least one second electrolyte solution disposed between at least one second electrode and a corresponding second charge barrier of the at least one second charge barrier, wherein the at least one second electrolyte solution is one of the same as and different from a corresponding first electrolyte solution of the at least one first electrolyte solution.

In one embodiment, the at least one electrolyte compensation device may further include at least one ion transfer channel which directly connects the corresponding first electrolyte solution and the corresponding second electrolyte solution without passing through the at least one flow path, wherein the at least one flow path is insulated from the at least one first charge barrier and the at least one second charge barrier during a discharging process wherein the ionic species move through a corresponding ion transfer channel of the at least one ion transfer channel, instead of the at least one flow path, wherein the discharging process prevents a reduction in a total concentration of ionic species in at least one of the corresponding first electrolyte solution and the corresponding second electrolyte solution.

In one embodiment, the at least one flow path may be insulated by air injected into the at least one flow path.

In one embodiment, the at least one electrolyte compensation device may be for both the at least one first electrolyte solution and the corresponding second electrolyte solution.

In one embodiment, the capacitive deionization device may further include at least one second electrolyte compensation device for the corresponding second electrolyte solution, the at least one electrolyte compensation device having substantially the same structure as the at least one electrolyte compensation device for the at least one first electrolyte solution.

In one embodiment, the at least one electrolyte compensation device includes; an electrolyte solution reservoir which receives at least one of the at least one first electrolyte solution and the at least one second electrolyte solution, an ionic conductivity sensor which measures an ionic concentration of the at least one first electrolyte solution and the at least one second electrolyte solution disposed in the electrolyte solution reservoir to produce an ionic conductivity measurement, an ionic conductivity meter which receives the ionic conductivity measurement from the ionic conductivity sensor and determines whether the ionic conductivity measurement is within a predetermined range, an ionic conductivity regulating unit which selectively regulates the ionic concentration of the at least one first electrolyte solution and the at least one second electrolyte solution disposed in the electrolyte solution reservoir based on a determination of the ionic conductivity meter, and an electrolytic return line which returns the at least one first electrolyte solution and the at least one second electrolyte solution disposed in the electrolyte solution reservoir to a space between the at least one first electrode of the at least one pair of a first electrode and a second electrode and the corresponding first charge barrier of the at least one first charge barrier and a space between the at least one second electrode of the at least one pair of a first electrode and a second electrode and the corresponding second charge barrier of the at least one second charge barrier.

According to another aspect of the present disclosure, a method of compensating for at least one of a loss of ionic species from at least one first electrolyte solution, a reduction in a total concentration of ionic species in the at least one first electrolyte solution and a reduction in a purity of the at least one first electrolyte solution, the method includes; introducing the at least one first electrolyte solution between a first electrode and a first charge barrier, flowing the at least one first electrolyte solution to a reservoir, changing an ionic concentration of the at least one first electrolyte solution disposed in the reservoir and reintroducing the at least one first electrolyte solution between the first electrode and the first charge barrier.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION

Figure 1:
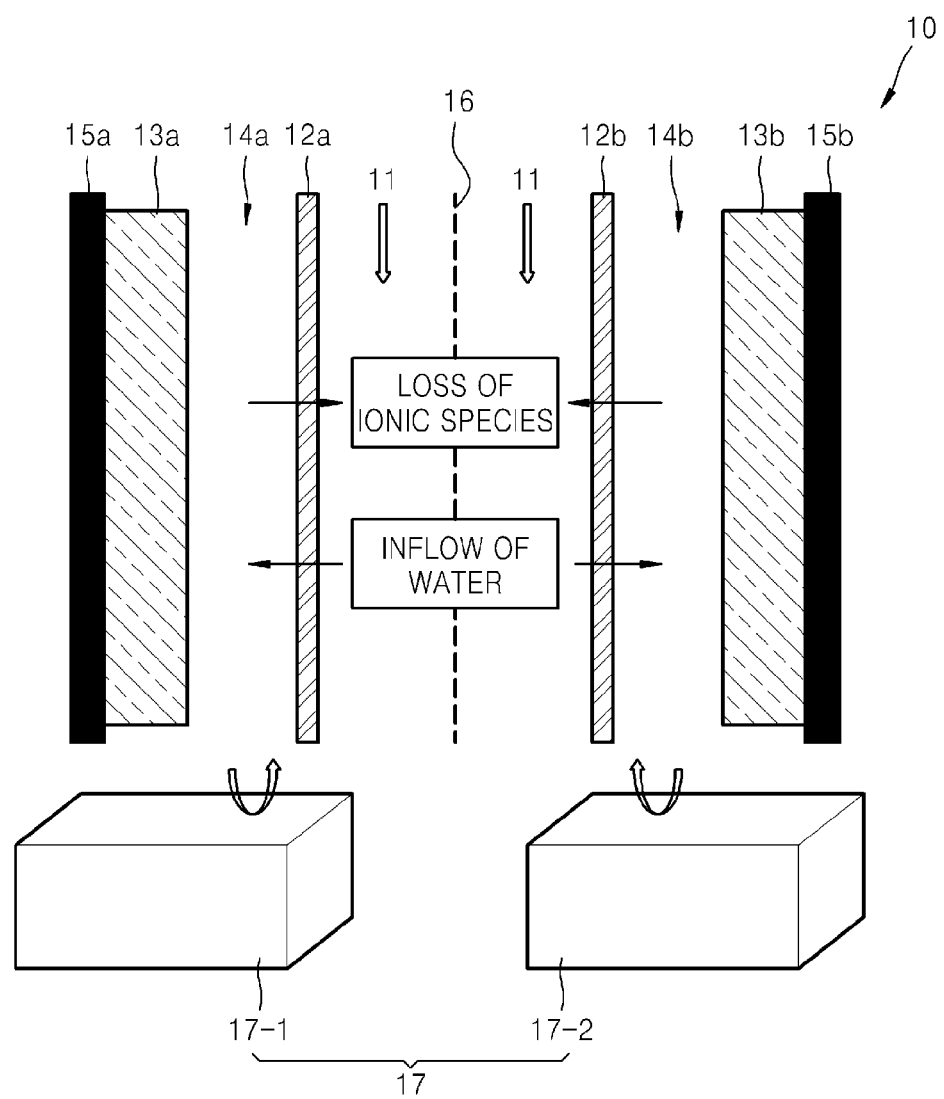
FIG. 1 is a schematic view of an embodiment of a capacitive deionization device ("CDI") according to the present disclosure.

Embodiments now will be described more fully hereinafter with reference to the accompanying drawings, in which embodiments of the invention are shown. The embodiments may, however, be embodied in many different forms and should not be construed as limited to the embodiments set forth herein. Rather, these embodiments are provided so that this disclosure will be thorough and complete, and will fully convey the scope of the embodiments to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting thereof. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another elements as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments should not be construed as limited to the particular shapes of regions illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the disclosure.

All methods described herein can be performed in a suitable order unless otherwise indicated herein or otherwise clearly contradicted by context. The use of any and all examples, or exemplary language (e.g., "such as"), is intended merely to better illustrate the disclosure and does not pose a limitation on the scope thereof unless otherwise claimed. No language in the specification should be construed as indicating any non-claimed element as essential to the practice of the embodiments as used herein.

Hereinafter, the embodiments will be described in detail with reference to the accompanying drawings.

Hereinafter, an embodiment of a capacitive deionization device according to the present invention will be described in detail with reference to the accompanying drawings.

FIG. 1 is a schematic cross-sectional view of an embodiment of a capacitive deionization device 10 according to the present disclosure.

Referring to FIG. 1, an embodiment of a capacitive deionization device ("CDI") 10 includes a flow path 11 for influent water, a pair of charge barriers 12a and 12b, a pair of electrodes 13a and 13b impregnated with electrolyte solutions 14a and 14b, respectively, a pair of current collectors 15a and 15b, and an electrolyte compensation device 17.

The influent water, which may be hard water, i.e., water with a high concentration of minerals as described below, flows along the flow path 11 and is deionized by the CDI 10. Throughout the specification, hard water refers to water containing a large amount of calcium ions, magnesium ions and/or other ions having similar characteristics and producing scaling, and which does not lather easily with soap. The influent water flowing into the flow path 11 may have an ionic conductivity of about 0.01 millisiemens (mS)/cm to about 10 mS/cm. When the ionic conductivity of the influent water is within the above range, the ions may be efficiently removed from the influent water without applying a high voltage or applying a large amount of charges (energy) into the pair of electrodes 13a and 13b.

The pair of charge barriers 12a and 12b are disposed to be opposite to, and separated from, each other with the flow path 11 disposed therebetween. The electrodes 13a and 13b, which will be described in more detail later, are ionically separated from the influent water flowing along the flow path 11 by the charge barriers 12a and 12b. However, the present disclosure is not limited to this structure. For example, alternative embodiments include configurations wherein only one of the charge barriers 12a and 12b may be used. In addition, one of the charge barriers 12a and 12b may be a selectively anion-permeable membrane, for example, an anion exchange membrane. In such an embodiment, the other one of the charge barriers 12a and 12b may be a selectively cation-permeable membrane, for example, a cation exchange membrane. Each of the anion exchange membrane and the cation exchange membrane may have an ion selectivity of, for example, about 99% to about 99.999%. When the ion selectivity is within the above range, the ion removal efficiency may be relatively high since the expulsion of co-ions from the pores of the porous electrodes 13a and 13b is efficiently prevented during charging. Embodiments also include configurations wherein the charge barriers 12a and 12b have an ion selectivity of more than about 99.999%, although charge-barriers 12a and 12b having such an efficiency are uncommon.

The electrolyte solutions 14a and 14b function as media for ion conduction in the pores of the respective porous electrodes 13a and 13b, which will be described in more detail later. selectively between the porous electrode 13a and the charge barrier 12a, and selectively between the porous electrode 13b and the charge barrier 12b, respectively.

At least one of the electrolyte solutions 14a and 14b differs in chemical composition from the influent water as described below. Throughout the specification, when a solution is described as being different from another solution, this means that at least one constituent component of one solution is different from the other solution and/or that the amount of at least one constituent component per unit volume of one solution is different than the other solution. On the other hand, when a solution is described as being substantially the same as another solution, this means that all constituent components and the amounts of the corresponding constituent components per unit volume are substantially the same between the two solutions.

For example, types and/or a total concentration of ionic species contained in at least one of the electrolyte solutions 14a and 14b may differ from those of ionic species contained in the influent water. In addition, types and/or a total concentration of ionic species contained in the electrolyte solution 14a may be the same as, or may differ from, those of ionic species contained in the electrolyte solution 14b. Throughout the specification, the term 'electrolyte' refers to a material that is dissolved in a solvent, wherein embodiments of the solvent include water, and dissociated into ions to induce the flow of current through the electrolyte solution 14a or 14b. In addition, throughout the specification, when types of ionic species are described as being different from another ionic species, this means that a set of ionic species contained in a solution differs from a set of ionic species contained in the other solution. On the other hand, when types of ionic species are described as being substantially the same as another one, this means a set of ionic species contained in one solution is substantially the same as a set of ionic species contained in the other solution. For example, at least one cationic species, for example, potassium ions ($K^+$), contained in at least one of the electrolyte solutions 14a and 14b may differ from any of the cationic species, for example, magnesium ions ($Mg^{2+}$) or calcium ions ($Ca^{2+}$), contained in the influent water, and/or at least one anionic species, for example, chloride ions ($Cl^-$), contained in at least one of the electrolyte solutions 14a and 14b may differ from any of the anionic species, for example, $HCO_3^-$, contained in the influent water.

In addition, the electrolyte solutions 14a and 14b may each independently include ionic species originated from at least one electrolyte selected from the group consisting of LiF, LiCl, LiBr, LiI, NaF, NaCl, NaBr, NaI, KF, KCl, KBr, KI, $LiNO_3$, $NaNO_3$, $KNO_3$, $Li_2SO_4$, $Na_2SO_4$, $K_2SO_4$, $MgCl_2$, $CaCl_2$, $CuCl_2$, $MgSO_4$, $CaSO_4$, $CuSO_4$ and other materials having similar characteristics.

In addition, in one embodiment at least one of the electrolyte solutions 14a and 14b may not contain an impurity and may contain an ionic species that is suitable for exhibiting the capacitance of active materials of the porous electrodes 13a and 13b that will be described later. As used herein, the term 'impurity' may be any materials dissolved in the electrolyte solutions 14a and 14b which may have unfavorable effects on exhibiting capacitance of the porous electrodes 13a and 13b. The impurity may be ionic species like $Ca^{2+}$ or $Mg^{2+}$ ions which are generally unsuitable for electrolyte components of a CDI because they have hydrated radii which are too large to transport through narrow pores of the porous electrodes 13a and 13b. Also, the impurities may be organic solvents that may increase the charge transfer resistance of the electrolyte solutions 14a and 14b.

Since the CDI 10 includes the porous electrodes 13a and 13b impregnated with the respective electrolyte solutions 14a and 14b having the characteristics described above, the elements of the CDI 10 that directly contact the electrolyte solutions 14a and 14b may be formed of a wide variety of materials. The elements of the CDI 10 that directly contact the electrolyte solutions 14a and 14b may include the electrodes 13a and 13b containing active materials, the current collectors 15a and 15b (e.g., they may contact the electrolyte solutions 14a and 14b via pores in the electrodes 13a and 13b), and the charge barriers 12a and 12b, and thus the CDI 10 has the following advantages described in detail below.

First, an on-set potential voltage at which a detrimental reaction occurs varies according to a combination of the types of electrolytes, i.e., the composition of the electrolytes, and the types of materials used in the electrodes. Decomposition of the electrolytes and/or the porous electrode materials due to an overvoltage immediately deteriorates performance of the electrodes. Thus, an electrolyte having a wide potential window with respect to a material of interest, e.g., for use in the porous electrodes 13a and 13b may be used to improve durability (cycle performance) of the CDI 10 including the same.

Second, the sizes of ions and the size of a hydrous layer formed from ions and water molecules vary according to the ionic species contained in an electrolyte solution. Thus, the ion transfer rate in the pores of the porous electrodes 13a and 13b, and in particular, in the mesopores and/or micropores of the porous electrodes 13a and 13b, is restricted when the sizes of hydrated ions are excessively large compared to the pore size of the porous electrodes 13a and 13b. In addition, the charge density of ions and the size of ions are significant factors determining the applicability of inner surfaces of micropores of the porous electrodes 13a and 13b. Thus, the ion transfer rate in the pores and capacitance exhibiting characteristics of the porous electrodes 13a and 13b may be improved by choosing an electrolyte suitable for a structure of an active material out of which the porous electrode 13 and 13b are constructed.

Third, the formation of scales, which may potentially occur on the porous electrodes 13a and/or 13b, may be prevented by adjusting the composition and pH of the electrolyte solutions 14a and/and 14b.

When the total concentration of the ionic species contained in at least one of the electrolyte solutions 14a and 14b is higher than the total concentration of the ionic species contained in the influent water, the CDI 10 may include the porous electrodes 13a and 13b impregnated with electrolyte solutions 14a and 14b. In such an embodiment, the capacitance of the active material and the charge/discharge rate may be improved, and an additional capacitance may be exhibited after a reverse bias voltage is applied thereto. These improvements may be obtained for the following reasons described in detail below.

First, the capacitance may vary according to the concentration of an ionic species, even when the same active material is used. For example, a porous carbon material used as an active material has a well-developed micro- and nano-sized pore network. However, if the concentration of an ionic species permeated into the pores is insufficiently low for adsorption therein, most of the adsorption area of the porous carbon material may not be properly utilized, due to a lack of the electrolyte across the adsorption area, and thus the capacitance thereof is reduced. Thus, most of, or all, the capacitance of the porous carbon material may be used by supplying a sufficient concentration of the electrolyte into the pores of the porous electrodes 13a and 13b.

Second, when the concentration of the ionic species in the pores is sufficient, high-rate charging and discharging are ensured, that is, the charging and discharging rates are greater than when the concentration of ionic species in the pores is insufficient as described above. In a porous material with a complex pore network, the electrical resistance generated due to ions moving in the pores is a factor limiting the charge/discharge rate of the material. A charge/discharge rate of a material is greatly influenced by the pore structure of the material and the ion conductivity of an electrolyte solution. In particular, the charge/discharge rate of the material may be maximized by supplying a high concentration of an electrolyte having high ion conductivity into the pores. Thus, a higher current may flow at a given overvoltage.

Third, interfacial characteristics between the charge barriers 12a and 12b and the electrolyte solutions 14a and 14b, respectively, may be improved. If mass transfer (i.e., ion transfer) at the interface between the charge barrier and the electrolyte solution is not sufficiently fast, the resistance at the interface may be increased. Thus, if an ionic species having a high concentration is disposed between the charge barrier and the electrolyte solution, concentration polarization caused by ion depletion during discharging may be suppressed.

Fourth, energy efficiency in deionization and regeneration processes may be improved as a result of a high concentration of ionic species in the pores and the improvement in interfacial characteristics described above.

Finally, if a sufficient ionic species is present in the pores, each of the porous electrodes 13a and 13b may be charged to an opposite polarity by applying an electric potential with a polarity opposite to the polarity of the electric potential applied for deionization in a process referred to as "reverse bias charging". The amount of charges and energy stored during this reverse bias charging may be used in a charging process (deionization), and thus theoretically the storable charges in the porous electrodes 13a and 13b may double. For example, if a pair of porous electrodes 13a and 13b are usually operated within a potential window of about 0 V to about 1 V, a range of about −1 V to about 1 V may be used during deionization due to initial reverse bias charging in an embodiment of a CDI according to the present disclosure. Thus, the amount of charges Q (Q=C×ΔV) is doubled. In the equation above, C denotes capacitance, and ΔV denotes voltage difference. On the other hand, when the concentration of the ionic species in the pores is low, such reverse bias charging may not occur due to lack of the ionic species for adsorption.

In addition, the CDI 10 may increase a recovery rate represented by Equation 1 below.

Recovery rate (%)={Total volume of treated water/
Total volume of influent water inflowed for
deionization and electrode regeneration}×100   <Equation 1>

When the influent water is hard water, the total concentration of ionic species, such as $K^+$ and $Cl^-$ ions, contained in at least one of the electrolyte solutions 14a and 14b, may be, for example, about 0.05 M to about 10 M. When the total concentration of the ionic species contained in at least one of the electrolyte solutions 14a and 14b is within the above range, the capacitance of the corresponding porous electrode 13a or 13b may be fully exhibited during charging and discharging, and the charge/discharge rate may be improved. In addition, in one embodiment, at least one of the electrolyte solutions 14a and 14b may include an acid, and may have a pH of about 1 to about 5. When at least one of the electrolyte solutions 14a and 14b has a pH within the above range, water may not be readily decomposed, e.g., electrolyzed, on a surface of the corresponding electrode so that a wider potential window for stable operation is ensured. In addition, precipitates which may occur due to the combination with $OH^-$ ions and $Ca^{2+}$ or $Mg^{2+}$ ions may not be generated. The acid prevents the deterioration of the porous electrodes 13a and 13b due to hard ionic components. Examples of the acid may include HCl, $HNO_3$, $H_2SO_4$, citric acid and/or other materials with similar characteristics.

The pair of electrodes 13a and 13b, which are porous, may be disposed to be opposite to and separated from each other with one, or a pair, of the charge barriers 12a and 12b disposed therebetween as illustrated in the embodiment shown in FIG. 1. The electrodes 13a and 13b may be disposed to be opposite to and separated from their corresponding charge barriers 12a and 12b, respectively. In such an embodiment, the electrolyte solutions 14a and 14b may be disposed in the pores of the respective electrodes 13a and 13b, between the porous electrode 13a and the charge barrier 12a, and between the porous electrode 13b and the charge barrier 12b (refer to FIGS. 1 through 4). Alternative embodiments include configurations wherein the porous electrodes 13a and 13b may be disposed to contact the charge barriers 12a and 12b, respectively (such an embodiment will be described in more detail with respect to FIG. 5). In such an alternative embodiment, the electrolyte solutions 14a and 14b may be disposed in the pores of the porous electrode 13a and the pores of the porous electrode 13b (refer to FIG. 5), respectively.

Although not illustrated, each of the electrodes 13a and 13b may include an active material, a binder and a conducting agent.

Embodiments of the active material may include a porous material having an electrical double layer capacitance. Throughout the specification, the term "electrical double layer" refer to a layer having an electrical structure similar to a condenser formed on interfaces between the electrode 13a and the electrolyte solution 14a, and/or between the electrode 13b and the electrolyte solution 14b. The electrical double layer may be formed when ionic species having an opposite polarity to the corresponding electrode 13a or 13b are adsorbed onto the electrode 13a or 13b that is impregnated with the corresponding electrolyte solution 14a or 14b and thereafter positively (+) or negatively (−) charged. In addition, the capacitance of the active material may be increased by 30% or more using the above-described electrolyte solutions 14a and 14b or hard water containing a high concentration of an ionic species, instead of the influent water (hard water containing a low concentration of an ionic species), as an electrolyte solution. The active material may include at least one material selected from the group consisting of an activated carbon, aerogel, carbon nanotubes ("CNTs"), a mesoporous carbon, an activated carbon fiber, a graphite oxide, a metal oxide and other materials with similar characteristics.

Embodiments of the binder may include styrene butadiene rubber ("SBR"), carboxymethylcellulose ("CMC"), polytetrafluoroethlyene ("PTFE"), or other materials with similar characteristics.

Embodiments of the conducting agent may include carbon black, vapor growth carbon fiber ("VGCF"), graphite, a combination of at least two thereof, or other materials having similar characteristics.

In addition, embodiments include configurations wherein at least one of the electrodes 13a and 13b may be a polarity-variable electrode. For example, in an embodiment wherein the electrode 13a functions as a positive electrode and the electrode 13b functions as a negative electrode during deionization, after the electrodes 13a and 13b are charged with a reverse bias voltage, i.e., a voltage having a polarity opposite to that applied for deionization by applying an electric potential voltage having the opposite polarity to the electric potential applied for deionization, the electrode 13a functions as a negative electrode and the electrode 13b functions as a positive electrode. Such a process is referred to as reverse bias charging as described above. The influent water may be deionized by applying an electric potential having a polarity opposite to that of each of the porous electrodes 13a and 13b during reverse bias charging. Such a process is simply referred to as "charging".

The pair of current collectors 15a and 15b is electrically connected to an external power source (not shown). The current collectors 15a and 15b apply a voltage to the pair of electrodes 13a and 13b, and are disposed on a side of the porous electrodes 13a and 13b, opposite to the flow path 11, respectively. The current collectors 15a and 15b may include a graphite plate, a graphite foil, at least one metal selected from the group consisting of copper (Cu), aluminum (Al), nickel (Ni), iron (Fe), cobalt (Co), and titanium (Ti), a metal mixture thereof, an alloy thereof or other materials having similar characteristics.

The CDI 10 may further include a spacer 16 that defines the flow path 11, a spacer (not shown) that defines a space between the electrode 13a and the charge barrier 12a, and/or a spacer (not shown) that defines a space between the electrode 13b and the charge barrier 12b. These spacers may be ion-permeable and electron-insulative, and may include an open mesh, a filter or other materials having similar characteristics.

The electrolyte compensation device 17 maintains the total concentration of ionic species in each of the electrolyte solutions 14a and 14b and the purities of the electrolyte solutions 14a and 14b by circulating, supplementing, concentrating, exchanging and/or detouring (when discharging) the electrolyte solutions 14a and 14b. In particular, the electrolyte compensation device 17 compensates for loss of ionic species (i.e., electrolyte components) from the electrolyte solutions 14a and 14b through the charge barriers 12a and 12b during the operation of the capacitive deionization device 10, gradual reduction in the total concentration of the ionic species in the electrolyte solutions 14a and 14b by the inflow of water, and/or gradual accumulation of impurities (e.g., detrimental ions) in the electrolyte solutions 14a and 14b that originate from the influent water. The ionic species in the electrolyte solutions 14a and 14b may be lost mainly during discharging (or electrode regeneration), and water of the influent water may inflow into at least one of the electrolyte solutions 14a and 14b by an osmotic pressure induced due to a difference between the total concentrations of ionic species in at least one of the electrolyte solutions 14a and 14b and the influent water. Throughout the specification, the wording 'electrolyte compensation' means circulating, supplementing, concentrating (removing the solvent from the electrolyte solution), recycling, and exchanging (typically, exchanging the electrolyte solutions with new ones) and/or preserving (for example, detouring the electrolyte solution during discharging) the electrolyte solution. Throughout the specification, the wording 'the purity of an electrolyte solution' means the concentration of impurities such as detrimental ions originating from, for example, the influent water in the electrolyte solution.

Figure 3:
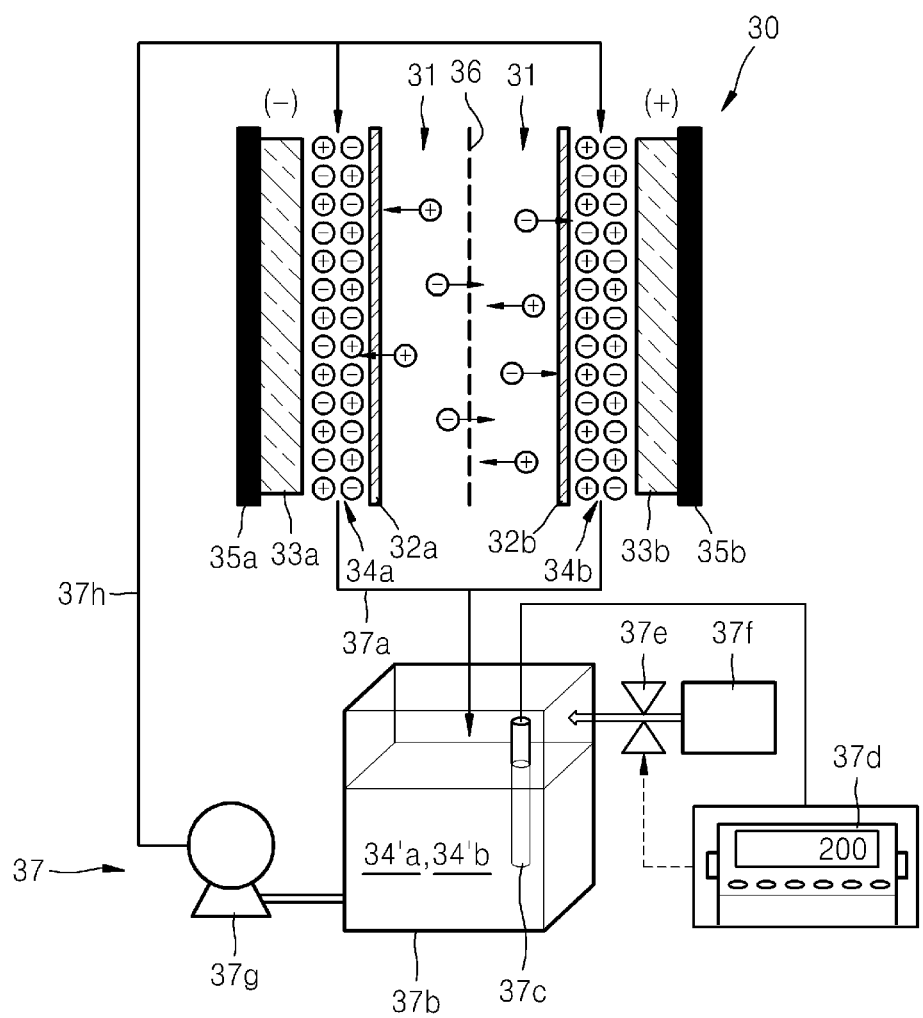
Figure 4:
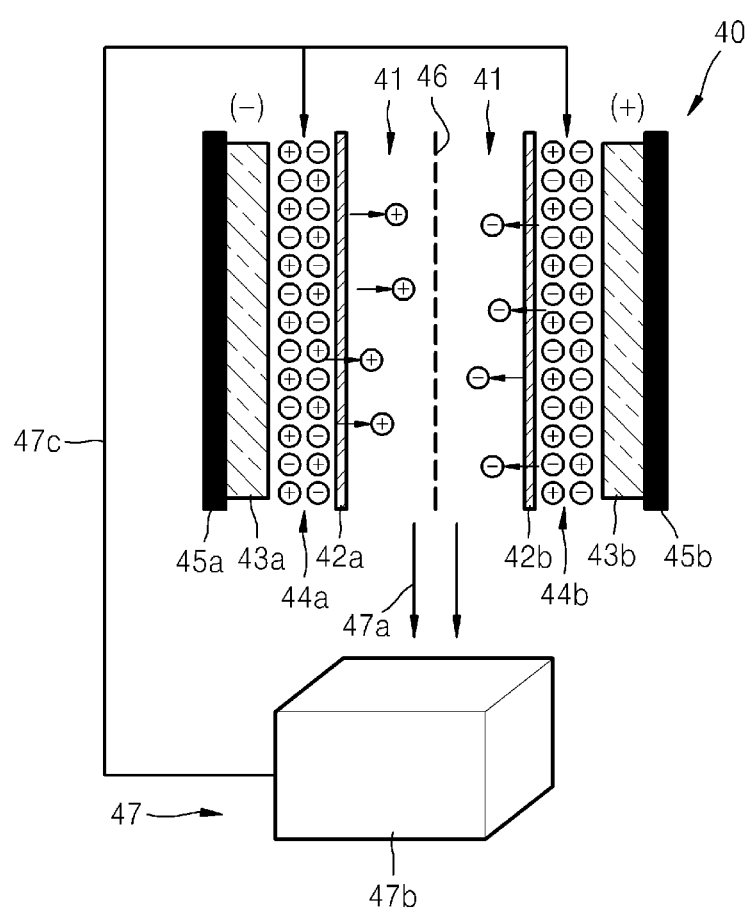
FIG. 4 is a schematic view of another embodiment of a CDI according to the present disclosure.

For example, when the total concentration of ionic species in at least one of the electrolyte solutions 14a and 14b, which may be directly or indirectly measured, is lower than a reference concentration, at least one of the electrolyte solutions 14a and 14b with the total concentration of ionic species lower than the reference concentration may be supplemented with an external electrolyte solution (not shown), the solvent may be removed from at least one of the electrolyte solutions 14a and 14b to concentrate the electrolyte solution 14a or 14b (FIG. 3), or the ionic species flowed into the influent water from at least one of the electrolyte solutions 14a and 14b may be recovered to be resupplied into the electrolyte solution 14a or 14b (FIG. 4). To this end, although not illustrated in FIG. 1, the electrolyte compensation device 17 may include a compensation timing determination unit and a compensation unit, which will be described later in detail with reference to FIGS. 2 through 4.

Figure 5:
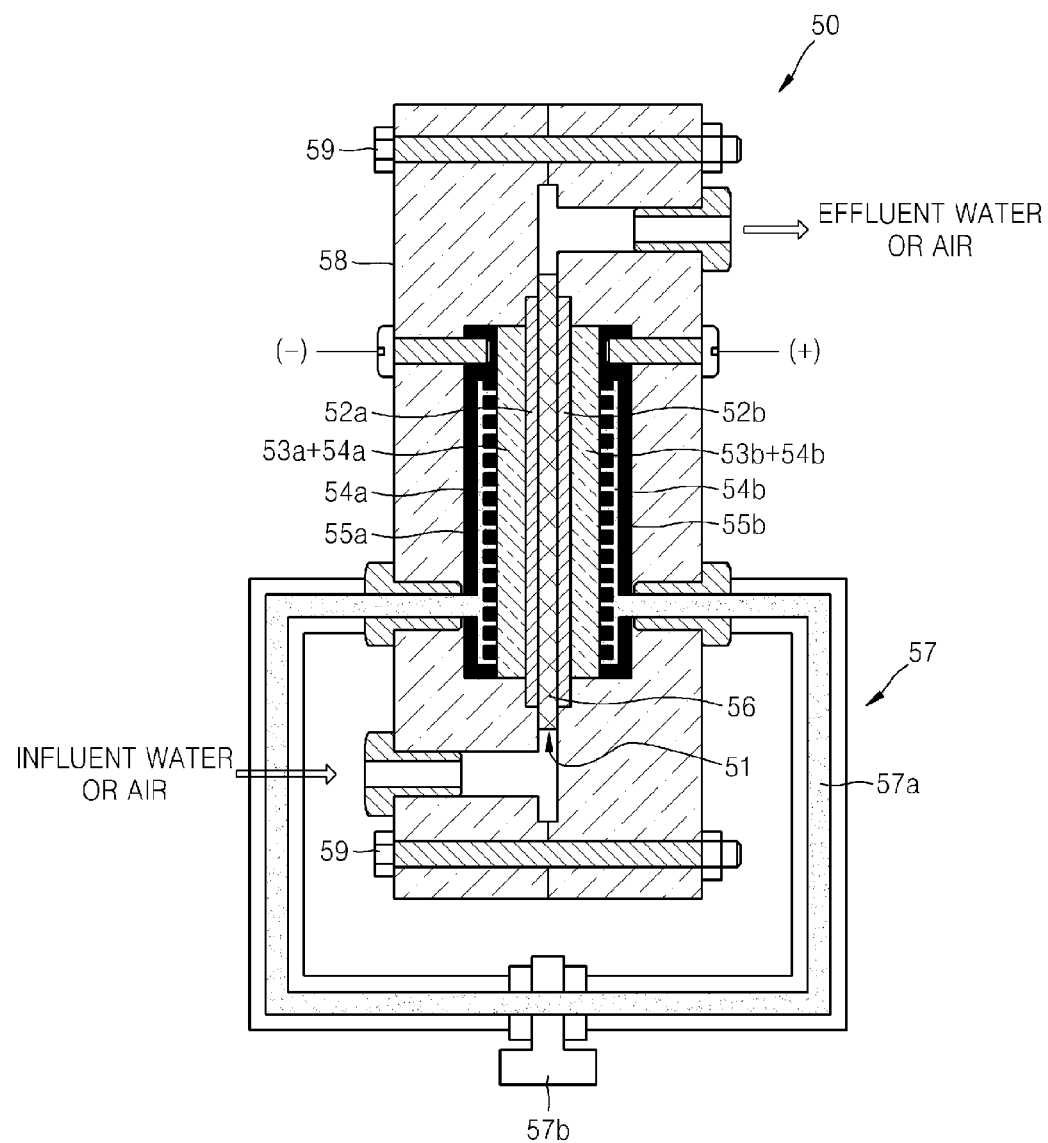
FIG. 5 is a schematic view of another embodiment of a CDI according to the present disclosure.

In addition, the electrolyte compensation device 17 may further include an ion transfer channel 57a (as shown in FIG. 5) that is not connected to a flow path 11, to transfer the ionic species during discharging, instead of through the flow path 11, which is insulated during the discharging, thereby preventing a reduction in the concentration of the ionic species. Impurities present in the influent water may flow into at least one of the electrolyte solutions 14a and 14b through at least one of the charge barriers 12a and 12b. In this case, the contaminated electrolyte solutions 14a and 14b may be exchanged with new electrolyte solutions to compensate for reduction of purity of the electrolyte solutions 14a and 14b.

In one embodiment, the CDI 10 may include two electrolyte compensation devices 17-1 and 17-2 for the electrolyte solutions 14a and 14b, respectively (as shown in FIG. 1). Alternative embodiments of the CDI 10 may include only one electrolyte compensation device for simultaneously compensating for the ionic species present in both of the electrolyte solutions 14a and 14b (FIGS. 2-5). For example, if the ionic species contained in the electrolyte solutions 14a and 14b are of the same type, only one electrolyte compensation device may be installed.

Figure 2:
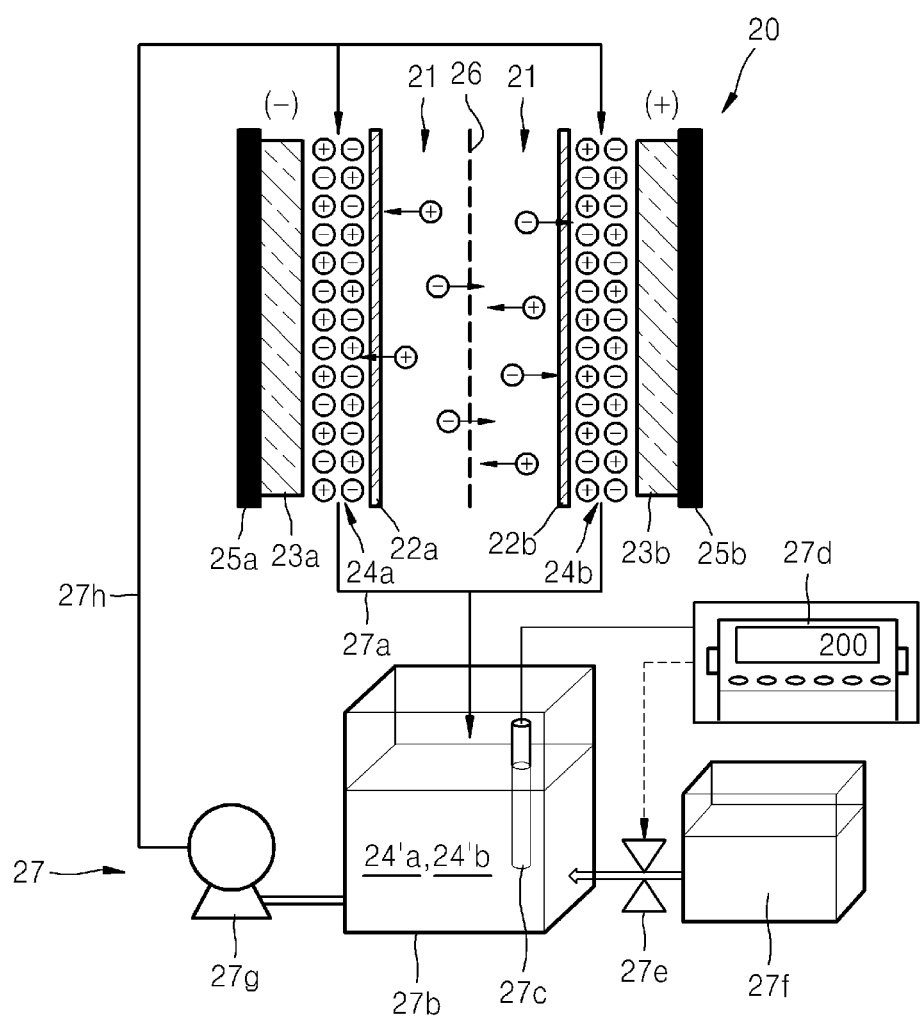
FIGS. 2 and 3 are schematic views illustrating embodiments of the CDI of FIG. 1.

FIGS. 2 and 3 are schematic views illustrating embodiments of the CDI 10 of FIG. 1.

Referring to FIG. 2, an embodiment of a CDI 20 includes a flow path 21 for influent water, a pair of charge barriers 22a and 22b, a pair of electrodes 23a and 23b impregnated with electrolyte solutions 24a and 24b, respectively, and a pair of current collectors 25a and 25b, and an electrolyte compensation device 27.

The electrolyte compensation device 27 includes a compensation timing determination unit that includes an electrolyte solution effluent line 27a, an electrolyte solution reservoir 27b, an ionic conductivity sensor 27c, and an ionic conductivity meter 27d; and a compensation unit that includes a valve 27e, an external electrolyte solution 27f, a pump 27g, and an electrolyte solution return line 27h. In this regard, the electrolyte solution reservoir 27b may have an open top or a closed top. Together, the compensation timing determination unit and the compensation unit may be referred to as an ionic conductivity regulating unit.

Hereinafter, the operating principle of the electrolyte compensation device 27 will be described in further detail. The operating principles of the other constituent elements of the CDI 20 are discussed above and disclosed in Korean Patent Application No. 2009-0077161.

Initially, when the CDI 20 is operated, the electrolyte solutions 24a and 24b are continuously circulated through the electrolyte solution effluent line 27a to the electrolyte solution reservoir 27b then to the pump 27g then to the electrolyte solution return line 27h. During the circulation of the electrolyte solutions 24a and 24b, the ionic conductivity sensor 27c equipped in the electrolyte solution reservoir 27b detects an ionic conductivity of electrolyte solutions 24'a and 24'b which have been transported to the electrolyte solution reservoir 27b and transmits a value of the ionic conductivity thereof to the ionic conductivity meter 27d.

Next, if the ionic conductivity (i.e., the total concentration of the ionic species) received by the ionic conductivity meter 27d is out of a predetermined range of reference ionic conductivities (i.e., a reference concentration of ionic species), the valve 27e is opened to inflow the external electrolyte solution 27f into the electrolyte solution reservoir 27b until the ionic conductivity of the electrolyte solutions 24'a and 24'b reaches a reference ionic conductivity. In other words, the pump 27g continues to operate, and the valve 27e is selectively opened only when a reduction in the total concentration of the electrolyte solutions 24'a and 24'b occurs.

Alternative embodiments of the CDI 20 may include, instead of the compensation timing determination unit described above, a compensation timing determination unit (not shown) that monitors a current or voltage applied to the pair of electrodes 23a and 23b to operate the compensation unit to introduce external electrolyte solution if the current or voltage is out of a reference current range or a reference voltage range.

Referring to FIG. 3, a CDI 30 includes a flow path 31 for influent water, a pair of charge barriers 32a and 32b, a pair of electrodes 33a and 33b impregnated with electrolyte solutions 34a and 34b, respectively, a pair of current collectors 35a and 35b, and an electrolyte compensation device 37.

The electrolyte compensation device 37 includes a compensation timing determination unit that includes an electrolyte solution effluent line 37a, an electrolyte solution reservoir 37b, an ionic conductivity sensor 37c, and an ionic conductivity meter 37d; and a compensation unit that includes a valve 37e, an air tank 37f, a pump 37g, and an electrolyte solution return line 37h. In this regard, the electrolyte solution reservoir 37b may have an open top or a closed top. If the electrolyte solution reservoir 37b has a closed top, an air outlet (not shown) and a valve (not shown) for closing the air outlet may be additionally equipped in the electrolyte solution reservoir 37b. The electrolyte compensation device 37 may readily compensate for the loss of ionic species from at least one of the electrolyte solutions 34a and 34b, and gradual reduction in the total concentration of the ionic species in at least one of the electrolyte solution 34a and 34b when the operation rate of the CDI 30 is low. Alternative embodiments include configurations wherein an air compressor device (not shown) may be used instead of the air tank 37f.

A difference of the CDI 30 of FIG. 3 from the CDI 20 of FIG. 2 lies in the structure of the compensation unit. In particular, if the ionic conductivity (i.e., the total concentration of the ionic species) received by the ionic conductivity meter 37d from the ionic conductivity sensor 37c is out of a predetermined range of reference ionic conductivities (i.e., a reference concentration of ionic species), the valve 37e is opened to force air in the air tank 37f to inflow into the electrolyte solution reservoir 37b, thereby rapidly evaporating solvent from the electrolyte solutions 34'a and 34'b, until the ionic conductivity of the electrolyte solutions 34'a and 34'b reaches a reference ionic conductivity through evaporation of the solvent of the electrolyte solutions 34'a and 34'b. The electrolyte solutions 34'a and 34'b are concentrated due to the evaporation of solvent, e.g., water, and inflowed into the electrolyte solutions 34a and 34b through the electrolyte solution return line 37 by the pump 37g. In this regard, the pump 37g continues to operate, and the valve 37e is selectively opened only when a reduction in the total concentration of at least one of the electrolyte solutions 34'a and 34'b occurs.

Alternative embodiments include configurations wherein, the air tank 37f may be omitted from the CDI 30. In such an alternative embodiment, when the valve 37e is opened, water in the electrolyte solution reservoir 37b is evaporated as air is circulated due to natural convention.

In addition, the CDI 30 of FIG. 3 may further include a heating device (not shown) for the electrolyte solution reservoir 37b, optionally instead of, or in addition to, the valve 37e and the air tank 37f, to increase the rate of solvent removal (i.e., the rate of concentration of the electrolyte solution).

FIG. 4 is a schematic view of another embodiment of a CDI 40 according to the present disclosure.

Referring to FIG. 4, the CDI 40 includes a flow path 41 for influent water, a pair of charge barriers 42a and 42b, a pair of electrodes 43a and 43b impregnated with electrolyte solutions 44a and 44b, respectively, a pair of current collectors 45a and 45b, and an electrolyte compensation device 47.

A difference of the CDI 40 of FIG. 4 from the CDI 20 of FIG. 2 lies in the structure of the electrolyte compensation device 47. In particular, the electrolyte compensation device 47 includes an effluent water effluent line 47a, an ionic species recovery unit 47b and an ionic species return line 47c. The ionic species recovery unit 47b recovers the ionic species moved into the effluent water from at least one of the electrodes 43a and 43b and/or at least one of the electrolyte solutions 44a and 44b during discharging and supplies the recovered ionic species back into the electrolyte solutions 44a and 44b, thereby compensating for a reduction in the total concentration of ionic species in at least one of the electrolyte solutions 44a and 44b. The ionic species may be recovered, for example, by evaporating water from the effluent water or by repeatedly recycling the effluent water to concentrate the ionic species.

FIG. 5 is a schematic view of another embodiment of a CDI 50 according to the present disclosure.

Referring to FIG. 5, the CDI 50 includes a flow path 51 for influent water, a pair of charge barriers 52a and 52b, a pair of electrodes 53a and 53b impregnated with electrolyte solutions 54a and 54b, respectively, a pair of current collectors 55a and 55b, an electrolyte compensation device 57, a housing 58 and a binding unit 59.

A difference of the CDI 50 of FIG. 5 from the CDI 20 of FIG. 2 lies in the structure of the electrolyte compensation device 57. In particular, the electrolyte compensation device 57 includes an ion transfer channel 57a and a valve 57b. The electrolyte compensation device 57 injects air, instead of the influent water, into the flow path 51 during discharging (i.e., electrode regeneration) to insulate the flow path 51, and opens the valve 57b to move the ionic species in the electrolyte solutions 54a and 54b through the ion transfer channel 57a, instead of the flow path 51, thereby a reduction in the total concentration of ionic species in the electrolyte solutions 54a and 54b may be prevented. In other words, the ionic species contained in the electrolyte solutions 54a and 54b are prevented from being lost into the flow path 51 through the charge barriers 52a and 52b. In addition, the CDI 50 may increase a recovery rate to almost 100% since the influent water is not used during discharging. Although not illustrated in FIG. 5, the CDI 50 may further include a device for supplementing an electrolyte or ionic species into at least one of the electrolyte solutions 54a and 54b and/or exchanging at least one of the electrolyte solutions 54 and 54b with new electrolyte solutions, directly or via the ion transfer channel 57a. However, the electrolyte compensation device 50 supplies the influent water, instead of air, into the flow path 51 during charging (i.e., deionization) and closes the valve 57b to prevent a movement of the ionic species in the electrolyte solutions 54a and 54b through the ion transfer channel 57a. The influent water is deionized while passing through the flow path 51 and then discharged as effluent water during charging.

Although the CDIs 10 to 50 of FIGS. 1 to 5 include one flow path, a pair of charge barriers, a pair of electrolyte solutions, a pair of electrodes and a pair of current collectors, the present invention is not limited thereto. For example, alternative embodiments of a capacitive deionization device of the present disclosure may be any of the CDIs disclosed in Korean Patent Application No. 2009-0077161 further including an electrolyte compensation device as described above.

The following examples are included for illustrative purposes only and are not intended to limit the scope of the invention.

Example 1

Manufacture of an Electrode and a Cell

1) Manufacture of Electrode

In the present example, 40 g of activated carbon (MSP 20, available from KANSAI COKE AND CHEMICALS Co., Ltd.), 10 g of carbon black, and 4.17 g of an aqueous suspension of 60% by weight of polytetrafluoroethylene ("PTFE"), and 130 g of propylene glycol were put into a stirring vessel, kneaded, and then press-molded to manufacture a porous electrode. The porous electrode was dried in an oven at 80° C. for 2 hours, at 120° C. for 1 hour, and at 200° C. for 1 hour to complete the manufacture of the porous electrode.

2) Manufacture of Cell and CDI

First, the porous electrode, which was dried as described above, was cut into 2 pieces, each having an area of 13.5 cm×9 cm (121.5 cm$^2$), and the weights of the electrodes were measured. Each of the porous electrodes had a weight of 2.0 g.

Second, the two porous electrodes were immersed in an electrolyte solution of 1 M aqueous NaCl solution in vacuum.

Third, a cell was manufactured by sequentially stacking a current collector, which in this example was a graphite plate, one of the porous electrodes as described above, a cation exchange membrane, which in this example was a Neosepta CMX from ASTOM Corporation, a separator, which in this example was a water-permeable open mesh, an anion exchange membrane, which in this example was a Neosepta AMX from ASTOM Corporation, the other one of the porous electrodes as described above and a current collector, which in this example was a graphite plate.

Figure 6:
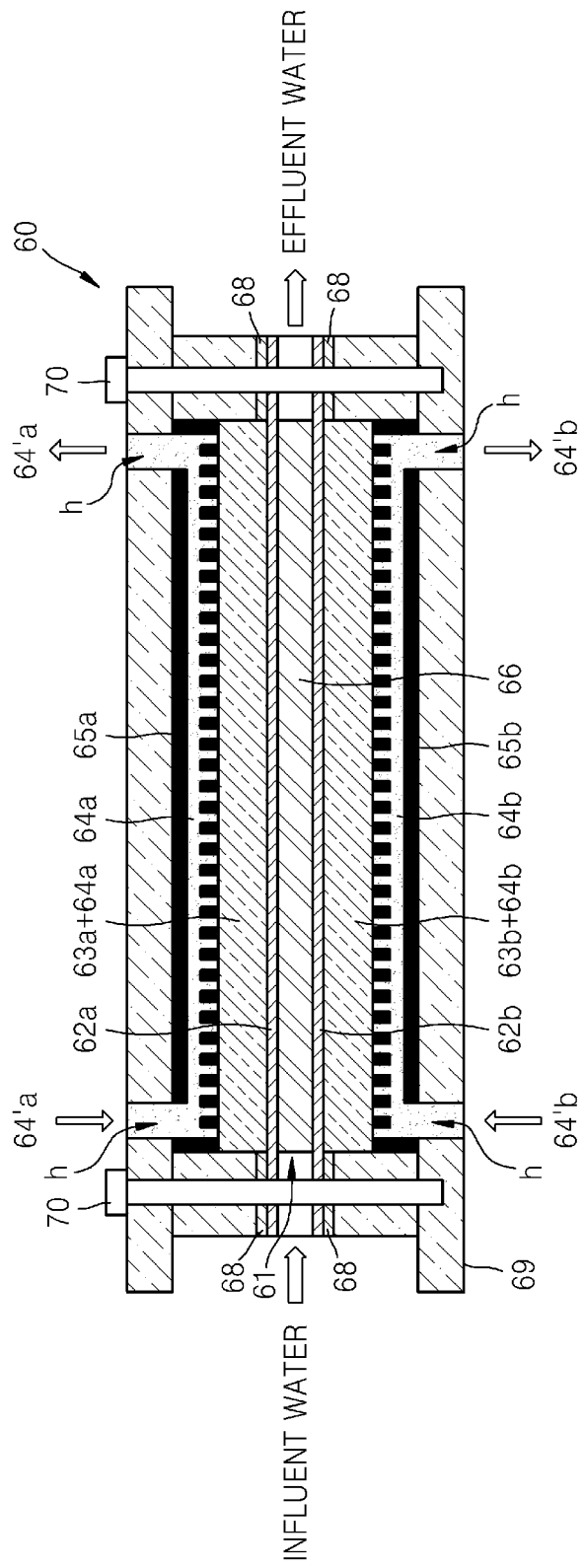
FIG. 6 is a schematic cross-sectional view of an embodiment of a CDI manufactured according to Example 1.

Fourth, A CDI 60 illustrated in FIG. 6 was manufactured from the cell as described above. In other words, the CDI 60 including a flow path 61 for influent water, a cation exchange membrane 62a, an anion exchange membrane 62b, a pair of electrodes 63a and 63b impregnated with 1 M aqueous NaCl solutions 64a and 64b, respectively, a pair of current collectors 65a and 65b, a gasket 68, a housing 69 and a coupling screw 70 were manufactured. In addition, four holes "h" were formed in the CDI 60 to circulate external electrolyte solutions 64'a and 64'b.

Fifth, 250 mL of the electrolyte solutions 64'a and 64'b of 1 M aqueous NaCl solutions was circulated through the holes h, spaces between each of the current correctors 65a and 65b and each of the corresponding porous electrodes 63a and 63b, and the pores of each of the electrodes 63a and 63b in sequence using a pump (not shown).

Comparative Example 1

In the comparative example, electrodes, a cell, and a CDI were manufactured in the same manner as in Example 1, except that circulating the electrolyte solutions 64'a and 64'b was omitted.

Evaluation Example

Cell Performance Evaluation

The CDIs manufactured in Example 1 and Comparative Example 1 were each operated under the following conditions.

(1) Variation in Ion Conductivity of Effluent Water with Time

Figure 7A:
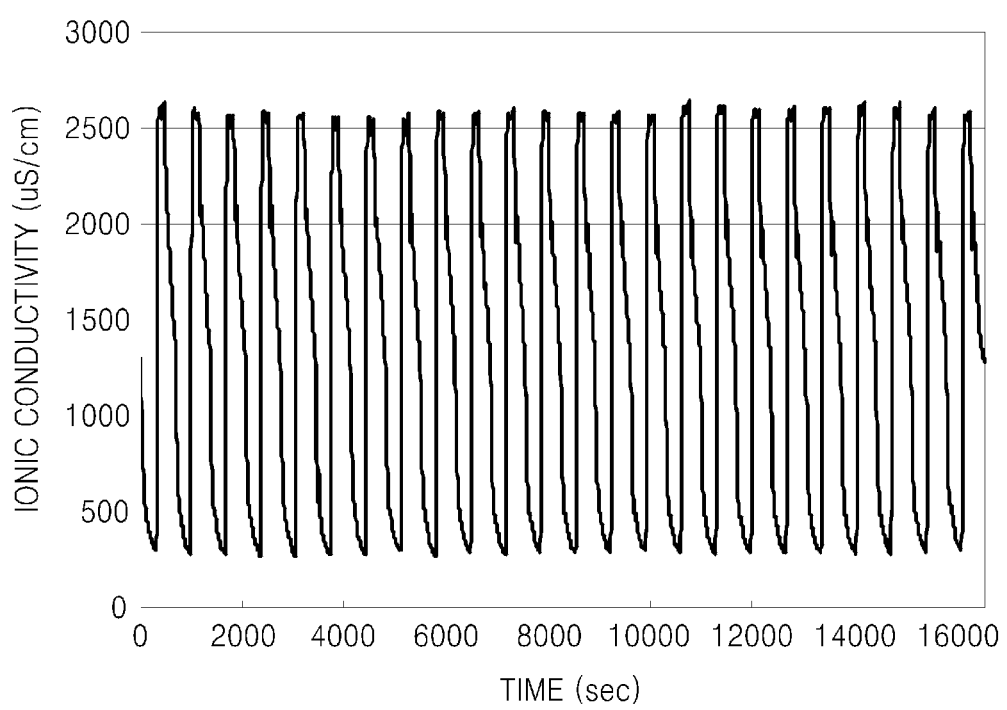
FIG. 7A is a graph showing variation in ion conductivity of treated water passed through an embodiment of a CDI of Example 1 with respect to time.
Figure 8A:
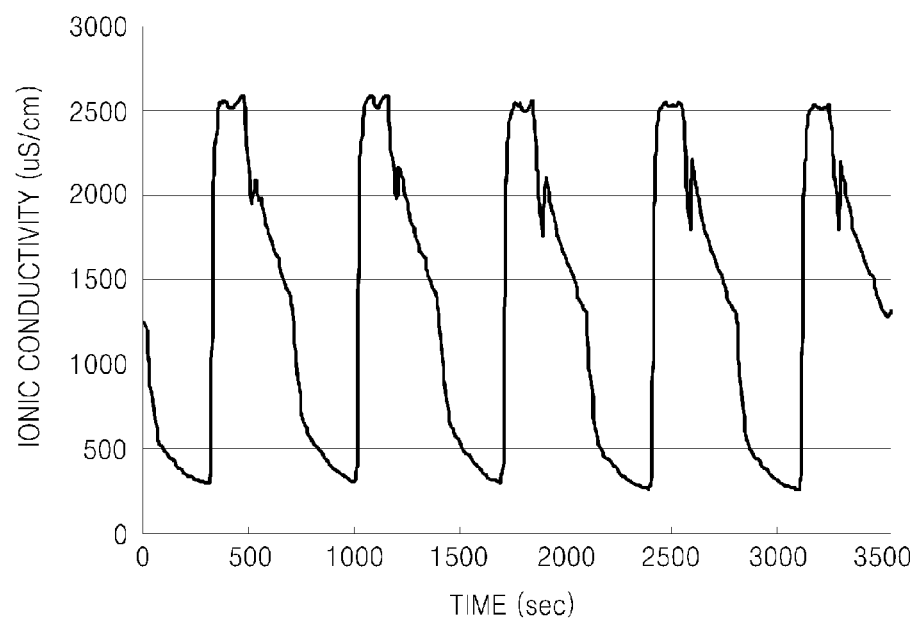
FIG. 8A is a graph showing variation in ion conductivity of treated water passed through a CDI of Comparative Example 1 with respect to time.

The ion conductivity of effluent water of each of the CDIs of Example 1 and Comparative Example 1 during charging and discharging was continuously measured during operation. The results are shown in FIGS. 7A and 8A. The ion conductivities of the effluent water were measured using an ionic conductivity meter (manufactured by HORIBA, D-54, Sensor: 3561-10D).

First, each of the cells was operated at room temperature, while a sufficient amount of influent water was supplied to the cell.

Second, 500 wtppm NaCl aqueous solution (1100 uS/cm) was used as the influent water, and the flow rate of the influent water was adjusted to 22 mL/min.

Third, a charge and discharge cycle was repeated as follows. Hereinafter, an electrode that contacts the cation exchange membrane and an electrode that contacts the anion exchange membrane are referred to as a negative electrode and a positive electrode, respectively. Initially, a power source was connected to each of the electrodes to supply a constant current of 280 mA (from the positive electrode to the negative electrode) for 5 minutes (this is a charging process). Then, the electrodes were discharged (i.e., regenerated) at a constant current of −420 mA until the voltage reached −0.5V. Next, in order to secure full discharging of the electrodes, the electrodes were disconnected from a voltage source for 40 seconds (Rest), electrically shorted (until the current dropped to 50 mA or less) and then disconnected from a voltage source for 1 minute (Rest) (this is a discharging process).

In FIGS. 7A and 8A, concave peaks represent charge peaks, and convex peaks represent discharge peaks.

Referring to FIGS. 7A and 8A, for both the CDIs of Example 1 and Comparative Example 1, the charge peaks were similar to the discharge peaks in size, and their size were maintained almost constant regardless of the number of charge and discharge cycles. Thus, the cells of Example 1 and Comparative Example 1 showed similar charge/discharge performance and excellent durability.

Figure 7B:
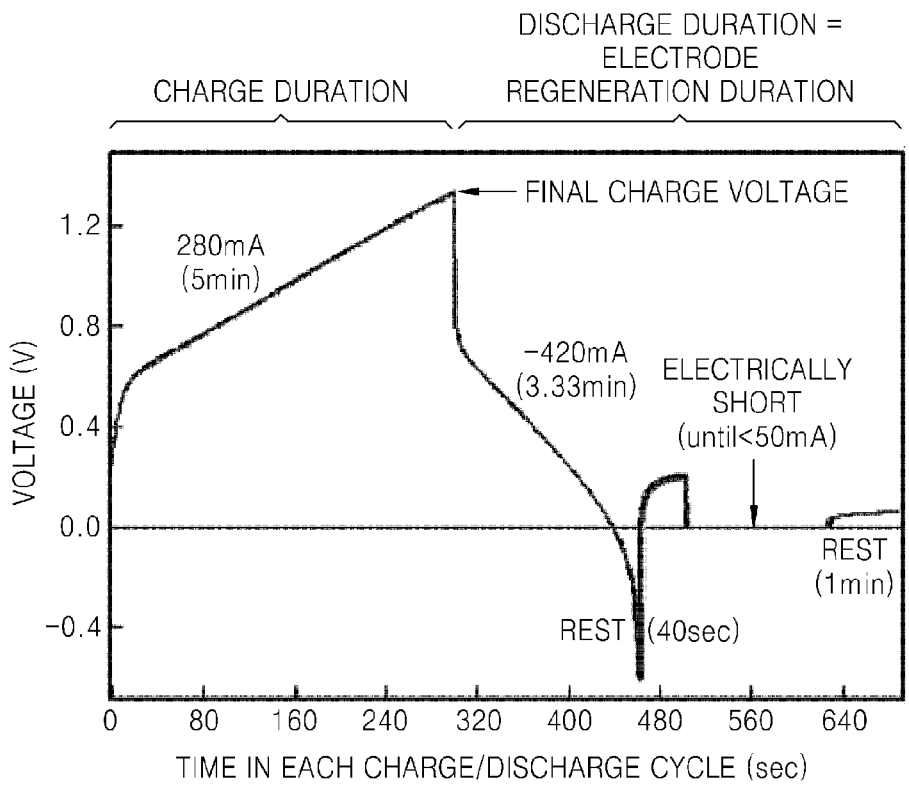
FIG. 7B is a graph showing variation in a charge voltage and a discharge voltage applied to the embodiment of a CDI of Example 1 with respect to time in each charge/discharge cycle.

(2) Variation in Final Charge Voltage with the Number of Charge/Discharge Cycles Variations in charge and discharge voltages with respect to time in each charge and discharge cycle were measured, while increasing the number of charge and discharge cycles. The results are shown in FIGS. 7B and 8B. Final charge voltage data for each charge and discharge cycle were collected from FIGS. 7B and 8B and are illustrated in FIGS. 7C and 8C.

Figure 7C:
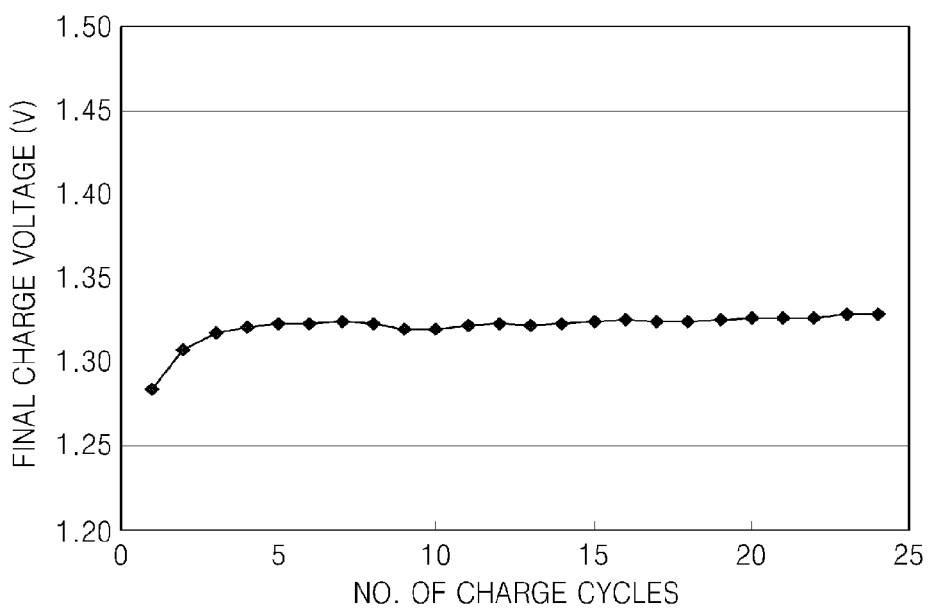
FIG. 7C is a graph showing variation in a final charge voltage applied to the embodiment of a CDI of Example 1 with respect to the number of charge cycles.
Figure 8B:
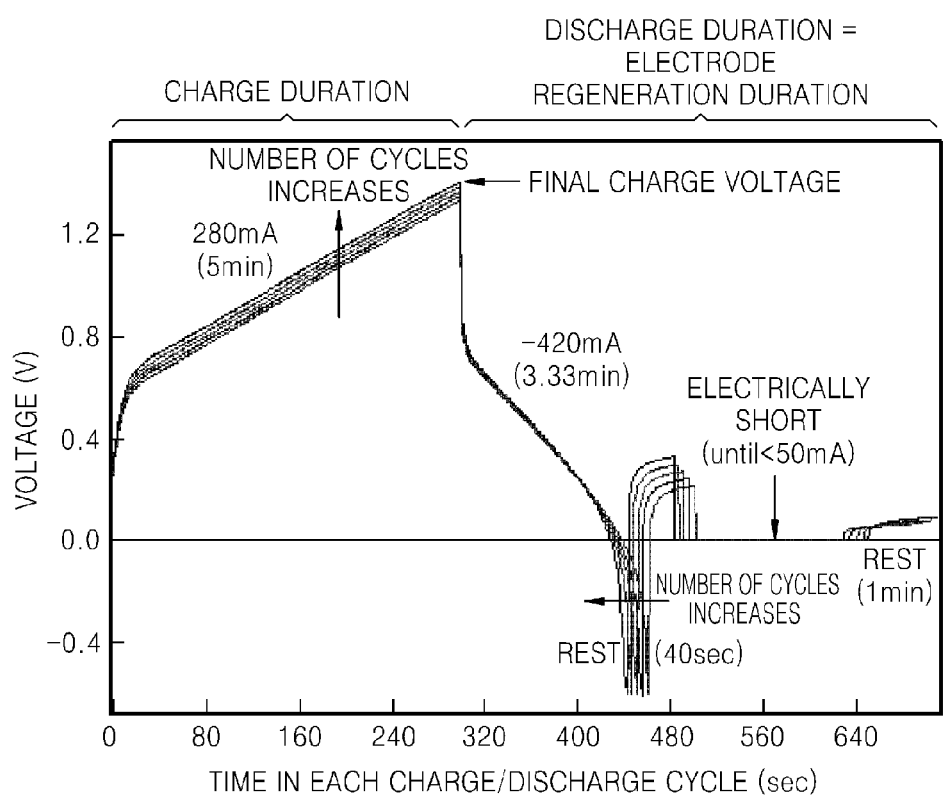
FIG. 8B is a graph showing variation in a charge voltage and a discharge voltage applied to the CDI of Comparative Example 1 with respect to time in each charge/discharge cycle.
Figure 8C:
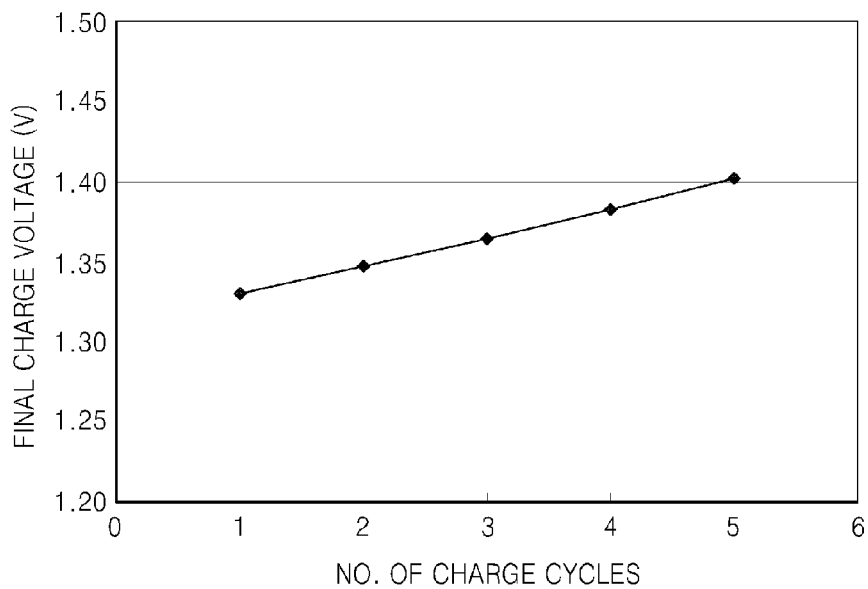
FIG. 8C is a graph showing variation in final charge voltage applied to the CDI of Comparative Example 1 with respect to the number of charge cycles.

Referring to FIGS. 7C and 8C, for the CDI of Example 1, the final charge voltage reached a steady state of about 1.32V after three charge and discharge cycles and was maintained at a substantially constant voltage until after about twenty-three charge and discharge cycles. Meanwhile, for the CDI of Comparative Example 1, the final charge voltage almost linearly increased with respect to the number of charge and discharge cycles. Concluding from the above results, in order to maintain constant their performance, the CDI of Example 1 used a constant voltage of about 1.32 V, whereas the CDI of Comparative Example 1 used a higher voltage with an increase in the number of charge and discharge cycles, indicating that the CDI of Example 1 had a higher energy efficiency than that of Comparative Example 1.

(3) Variation in Discharge Duration (Electrode Regeneration Duration)

Discharge duration data for each charge and discharge cycle were extracted from FIGS. 7B and 8B. The results are shown in FIGS. 7D and 8D.

Figure 7D:
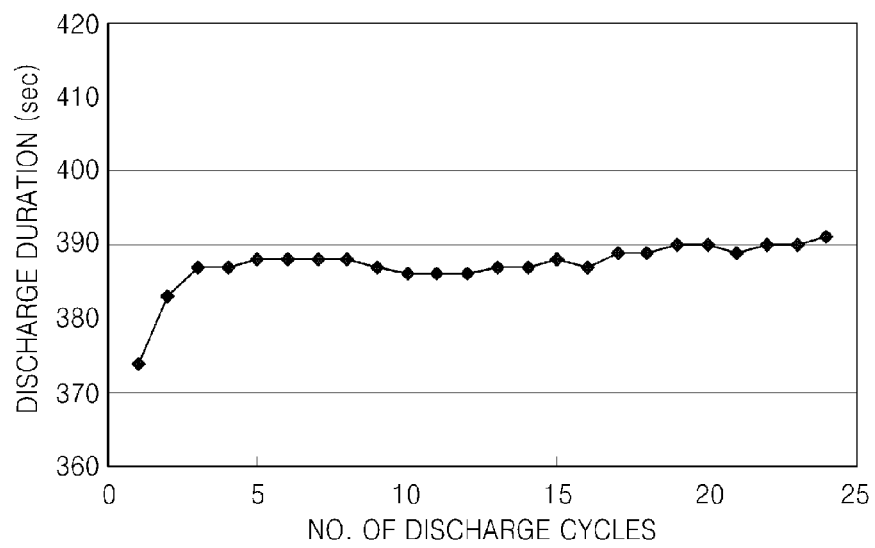
FIG. 7D is a graph showing variation in discharge duration (i.e., electrode regeneration duration) of the embodiment of a CDI of Example 1 with respect to the number of discharge cycles.
Figure 8D:
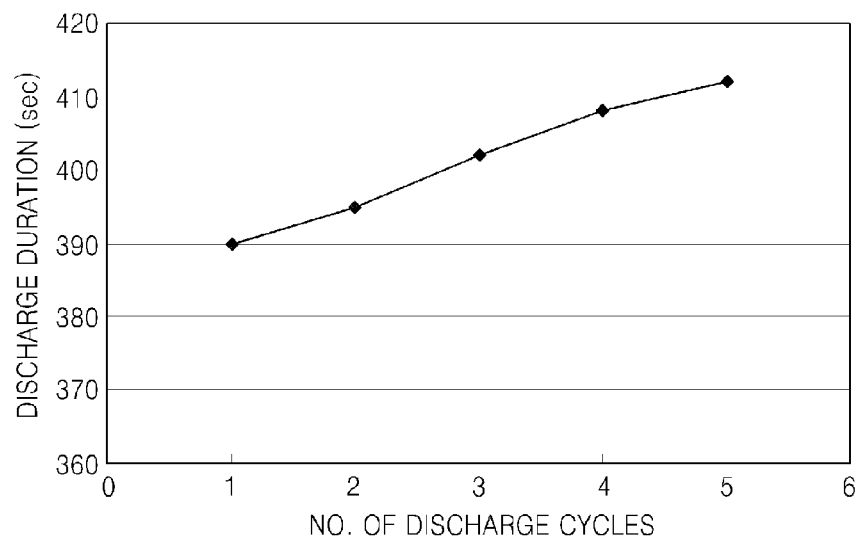
FIG. 8D is a graph showing variation in a discharge duration (i.e., electrode regeneration duration) of the CDI of Comparative Example 1 with respect to the number of discharge cycles.

Referring to FIGS. 7D and 8D, for the CDI of Example 1, the discharge duration reached a steady state of about 388 seconds to about 392 seconds after three charge and discharge cycles and was maintained at a substantially constant level until after about twenty-three charge and discharge cycles. Meanwhile, for the CDI of Comparative Example 1, the discharge duration increased almost linearly with respect to the number of charge and discharge cycles. Concluding from the above results, in order to maintain constant performance, the CDI of Example 1 took a constant discharge duration of about 388 seconds to about 392 seconds, whereas the CDI of Comparative Example 1 took a longer discharge duration and used a larger amount of water for electrode regeneration with an increase in the number of charge and discharge cycles, indicating that the CDI of Example 1 had a higher recovery rate of influent water than that of Comparative Example 1.

It should be understood that the embodiments described therein should be considered in a descriptive sense only and not for purposes of limitation. Descriptions of features or aspects within each embodiment should typically be considered as available for other similar features or aspects in other embodiments.

What is claimed is:

1. A capacitive deionization device comprising: at least one flow path configured to receive influent fluid; at least one pair of electrodes; at least one charge barrier disposed between the at least one flow path and a corresponding electrode of the at least one pair of electrodes;

at least one electrolyte solution disposed between at least one electrode of the at least one pair of electrodes and a corresponding charge barrier of the at least one charge barrier; and at least one electrolyte compensation device in fluid communication with the at least one electrolyte solution, wherein the at least one electrolyte solution differs from the influent fluid, and wherein the at least one electrolyte compensation device comprises a compensation timing determination unit and a compensation unit.

2. The capacitive deionization device of claim 1, wherein the compensation timing determination unit measures a total concentration of ionic species contained in the at least one electrolyte solution, and starts operation of the compensation unit if the total concentration of the ionic species is out of a reference concentration range.

3. The capacitive deionization device of claim 1, wherein the compensation timing determination unit monitors at least one of a current applied between the at least one pair of electrodes and a voltage applied between the at least one pair of electrodes, and starts operation of the compensation unit when at least one of a measured current and a measured voltage is out of at least one of a reference current range and a reference voltage range.

4. The capacitive deionization device of claim 1, wherein the compensation unit compensates for a difference between a total concentration of ionic species contained in the at least one electrolyte solution and a reference concentration by supplementing the at least one electrolyte solution with an external electrolyte solution.

5. The capacitive deionization device of claim 1, wherein the compensation unit compensates for a difference between a total concentration of ionic species contained in the at least one electrolyte solution and a reference concentration by removing a solvent component from the at least one electrolyte solution.

6. The capacitive deionization device of claim 1, wherein the at least one electrolyte compensation unit compensates for a reduction in a total concentration of ionic species contained in the at least one electrolyte solution by recovering ionic species which are moved into the influent fluid from the at least one electrode and the corresponding electrolyte solution during a discharging process and supplying the recovered ionic species back into the at least one electrolyte solution.

7. The capacitive deionization device of claim 1, wherein the at least one electrolyte compensation device compensates for a reduction in a purity of the at least one electrolyte solution by exchanging the at least one electrolyte solution with an external electrolyte solution.

8. The capacitive deionization device of claim 1, wherein the at least one charge barrier comprises at least one of a selectively cation-permeable membrane and a selectively anion-permeable membrane.

9. The capacitive deionization device of claim 1, wherein the at least one electrolyte solution comprises types of ionic species which differ from types of ionic species contained in the influent fluid.

10. The capacitive deionization device of claim 1, wherein the at least one electrolyte solution comprises a higher total concentration of ionic species than a total concentration of ionic species contained in the influent fluid.

11. The capacitive deionization device of claim 1, wherein the at least one electrode comprises a polarity-variable electrode.

12. The capacitive deionization device of claim 1, further comprising at least one spacer which defines the at least one the flow path.

13. The capacitive deionization device of claim 1, further comprising at least one current collector disposed on a side of each of the at least one pair of electrodes opposite to the flow path corresponding to the at least one pair of electrodes.

14. A capacitive deionization device comprising: at least one flow path configured to receive influent fluid; at least one pair of a first electrode and a second electrode; at least one first charge barrier disposed between the at least one flow path and
a corresponding first electrode of the at least one pair of a first electrode and a second electrode;
at least one second charge barrier disposed between the at least one flow path and a corresponding second electrode of the at least one pair of a first electrode and a second electrode;
at least one first electrolyte solution disposed between at least one first electrode of the at least one pair of a first electrode and a second electrode and a corresponding first charge barrier of the at least one first charge barrier; and
at least one first electrolyte compensation device which compensates for at least one of a loss of ionic species from the at least one first electrolyte solution, a reduction in a total concentration of ionic species in the at least one first electrolyte solution and a reduction in a purity of the at least one first electrolyte solution, wherein the at least one first electrolyte solution differs from the influent fluid, and wherein the at least one first electrolyte compensation device further comprises:
at least one ion transfer channel which directly connects the corresponding first electrolyte solution and the corresponding second electrolyte solution without passing through the at least one flow path, wherein the at least one flow path is insulated from the at least one first charge barrier and the at least one second charge barrier during a discharging process wherein the ionic species move through a corresponding ion transfer channel of the at least one ion transfer channel, instead of the at least one flow path, wherein the discharging process prevents a reduction in a total concentration of ionic species in at least one of a corresponding first electrolyte solution and a corresponding second electrolyte solution.

15. The capacitive deionization device of claim 14, wherein the at least one first charge barrier comprises a selectively cation-permeable membrane, and the at least one second charge barrier comprises a selectively anion-permeable membrane.

16. The capacitive deionization device of claim 14, further comprising at least one second electrolyte solution disposed between at least one second electrode of the at least one pair of a first electrode and a second electrode and a corresponding second charge barrier of the at least one second charge barrier,
wherein the at least one second electrolyte solution is one of the same as and different from a corresponding first electrolyte solution of the at least one first electrolyte solution.

17. The capacitive deionization device of claim 14, wherein the at least one flow path is insulated by air injected into the at least one flow path.

18. The capacitive deionization device of claim 16, wherein the at least one first electrolyte compensation device is in fluid communication with both the at least one first electrolyte solution and the at least one second electrolyte solution.

19. The capacitive deionization device of claim 16, further comprising at least one second electrolyte compensation device which compensates for at least one of a loss of ionic species from the at least one second electrolyte solution, a reduction in a total concentration of ionic species in the at least one second electrolyte solution and a reduction in a purity of the at least one second electrolyte solution,
wherein the at least one second electrolyte compensation device has substantially a same structure as the at least one first electrolyte compensation device.

20. The capacitive deionization device of claim 16, wherein the at least one first electrolyte compensation device comprises:
an electrolyte solution reservoir which receives at least one of the at least one first electrolyte solution and the at least one second electrolyte solution;
an ionic conductivity sensor which measures an ionic concentration of the at least one first electrolyte solution and the at least one second electrolyte solution disposed in the electrolyte solution reservoir to produce an ionic conductivity measurement;
an ionic conductivity meter which receives the ionic conductivity measurement from the ionic conductivity sensor and determines whether the ionic conductivity measurement is within a predetermined range;
an ionic conductivity regulating unit which selectively regulates the ionic concentration of the at least one first electrolyte solution and the at least one second electrolyte solution disposed in the electrolyte solution reservoir based on a determination of the ionic conductivity meter; and
an electrolytic return line which returns the at least one first electrolyte solution and the at least one second electrolyte solution disposed in the electrolyte solution reservoir to a space between the at least one first electrode of the at least one pair of a first electrode and a second electrode and the corresponding first charge barrier of the at least one first charge barrier and a space between the at least one second electrode of the at least one pair of a first electrode and a second electrode and the corresponding second charge barrier of the at least one second charge barrier.

* * * * *